United States Patent
Haley et al.

(10) Patent No.: US 12,407,587 B2
(45) Date of Patent: Sep. 2, 2025

(54) PACKET CAPTURE BASED WI-FI PERFORMANCE ANALYSIS

(71) Applicant: Spirent Communications, Inc., San Jose, CA (US)

(72) Inventors: Michael Haley, Marlboro, MA (US); David Theodore Mozzoni, II, Warwick, RI (US); Fanny Mlinarsky, Bolton, MA (US)

(73) Assignee: Spirent Communications, Inc., Santa Clara, CA (US)

( * ) Notice: Subject to any disclaimer, the term of this patent is extended or adjusted under 35 U.S.C. 154(b) by 395 days.

(21) Appl. No.: 18/106,967

(22) Filed: Feb. 7, 2023

(65) Prior Publication Data

US 2023/0254226 A1    Aug. 10, 2023

Related U.S. Application Data

(60) Provisional application No. 63/307,973, filed on Feb. 8, 2022.

(51) Int. Cl.
*H04L 43/045* (2022.01)
*H04L 43/08* (2022.01)
(Continued)

(52) U.S. Cl.
CPC ............ *H04L 43/045* (2013.01); *H04L 43/08* (2013.01); *H04L 43/12* (2013.01); *H04W 24/06* (2013.01); *H04W 84/12* (2013.01)

(58) Field of Classification Search
CPC ....... H04L 43/045; H04L 43/08; H04L 43/12; H04L 43/026; H04L 43/50; H04L 41/22; H04W 24/06; H04W 84/12; H04W 24/08
See application file for complete search history.

(56) References Cited

U.S. PATENT DOCUMENTS 6,724,730 B1    4/2004 Mlinarsky et al.
7,075,893 B1    7/2006 Mlinarsky et al.
(Continued)

OTHER PUBLICATIONS

U.S. Appl. No. 16/515,721, filed Jul. 18, 2019, U.S. Pat. No. 10,897,319, Jan. 19, 2021, Issues
(Continued)

*Primary Examiner* — Schquita D Goodwin
(74) *Attorney, Agent, or Firm* — HAYNES BEFFEL & WOLFELD LLP; Ernest J. Beffel, Jr.

(57) ABSTRACT

The disclosed technology teaches creating a real time visualization and analysis of Wi-Fi performance and behavior of a DUT in wireless communication with a selected Wi-Fi test device. Also included is performing a radiated test of the DUT using transceiver signals from multiple test antennas impinging on antennas of the DUT, capturing packet details of traffic between the DUT and the selected Wi-Fi test device using a sniffer that is RF coupled to antennas of the selected Wi-Fi test device, and generating a time series summary stream in real time from the packet details captured by the sniffer, including summaries of both performance and behavior metrics. The performance metrics summarize throughput and other measured characteristics of a received signal and the behavior metrics capture transmitter settings that the DUT and test devices choose. Also included is generating scrolling visualizations of selected metrics from the stream as the radiated test proceeds.

21 Claims, 12 Drawing Sheets

(51) Int. Cl.
*H04L 43/12* (2022.01)
*H04W 24/06* (2009.01)
*H04W 84/12* (2009.01)

(56) References Cited

U.S. PATENT DOCUMENTS

| | | | |
|---|---|---|---|
| 8,793,541 | B2 | 7/2014 | Hsu et al. |
| 10,520,534 | B1 | 12/2019 | Rowell et al. |
| 10,826,624 | B1* | 11/2020 | Lin .................... H04B 7/10 |
| 10,893,494 | B2 | 1/2021 | Chinitz et al. |
| 2004/0236866 | A1 | 11/2004 | Dugatkin et al. |
| 2005/0053008 | A1 | 3/2005 | Griesing et al. |
| 2005/0226195 | A1 | 10/2005 | Paris et al. |
| 2006/0229020 | A1 | 10/2006 | Mlinarsky et al. |
| 2006/0233111 | A1 | 10/2006 | Wright |
| 2006/0239198 | A1 | 10/2006 | Mlinarsky et al. |
| 2007/0159199 | A1 | 7/2007 | Talwar et al. |
| 2008/0151762 | A1 | 6/2008 | Armstrong et al. |
| 2009/0072838 | A1 | 3/2009 | Shepherd et al. |
| 2009/0072843 | A1 | 3/2009 | Slupsky et al. |
| 2012/0039178 | A1 | 2/2012 | Holman et al. |
| 2012/0101985 | A1 | 4/2012 | Kemp et al. |
| 2012/0207030 | A1 | 8/2012 | Luong |
| 2012/0296996 | A1 | 11/2012 | Lehavi et al. |
| 2012/0317224 | A1 | 12/2012 | Caldwell et al. |
| 2013/0016739 | A1 | 1/2013 | Penisoara et al. |
| 2013/0033279 | A1 | 2/2013 | Sozanski et al. |
| 2013/0054170 | A1 | 2/2013 | Sobajic et al. |
| 2013/0145212 | A1 | 6/2013 | Hsu et al. |
| 2013/0338958 | A1* | 12/2013 | Shanishchara ......... G01C 25/00 702/116 |
| 2013/0347103 | A1 | 12/2013 | Veteikis et al. |
| 2014/0092807 | A1 | 4/2014 | Zhao |
| 2014/0098846 | A1 | 4/2014 | Emmanuel et al. |
| 2014/0254647 | A1 | 9/2014 | Stott et al. |
| 2015/0109941 | A1 | 4/2015 | Zhang et al. |
| 2015/0242294 | A1 | 8/2015 | Lapierre et al. |
| 2015/0253357 | A1 | 9/2015 | Olgaard |
| 2016/0072594 | A1 | 3/2016 | Yuan et al. |
| 2016/0373944 | A1 | 12/2016 | Jain et al. |
| 2017/0135145 | A1 | 5/2017 | Amini et al. |
| 2017/0223559 | A1 | 8/2017 | Kong et al. |
| 2018/0006745 | A1 | 1/2018 | Vanwiggeren |
| 2019/0155327 | A1 | 5/2019 | Zaidman et al. |
| 2020/0028905 | A1 | 1/2020 | Chinitz et al. |
| 2022/0077942 | A1* | 3/2022 | Chervyakov ......... H04L 5/0048 |
| 2022/0132340 | A1* | 4/2022 | Olgaard ................ H04W 24/08 |
| 2024/0196431 | A1* | 6/2024 | Hirzallah ............... H04W 24/08 |
| 2024/0214080 | A1* | 6/2024 | Jing ....................... H04B 17/11 |

OTHER PUBLICATIONS

U.S. Appl. No. 16/515,786, filed Jul. 18, 2019, U.S. Pat. No. 10,893,494, Jan. 12, 2021, Issued.
U.S. Appl. No. 16/515,809, filed Jul. 18, 2019, U.S. Pat. No. 11,134,456, Sep. 28, 2021, Issued.
OCTOBOX Pal-6E, and STApal-6E Product datasheet, Spirent Communications, Inc., Mar. 21, 2022, 25 pages (downloaded Jan. 24, 2023 from https://www.spirent.com/assets/u/datasheet-octobox-pal-6e-and-stapal-6e).
MCS Index and 7MCS Wi-Fi Experience Score, WiFi Fundamentals, 7signal.com, 6 pages (download Feb. 8, 2022 from https://www.7signal.com/info/mcs_).

* cited by examiner

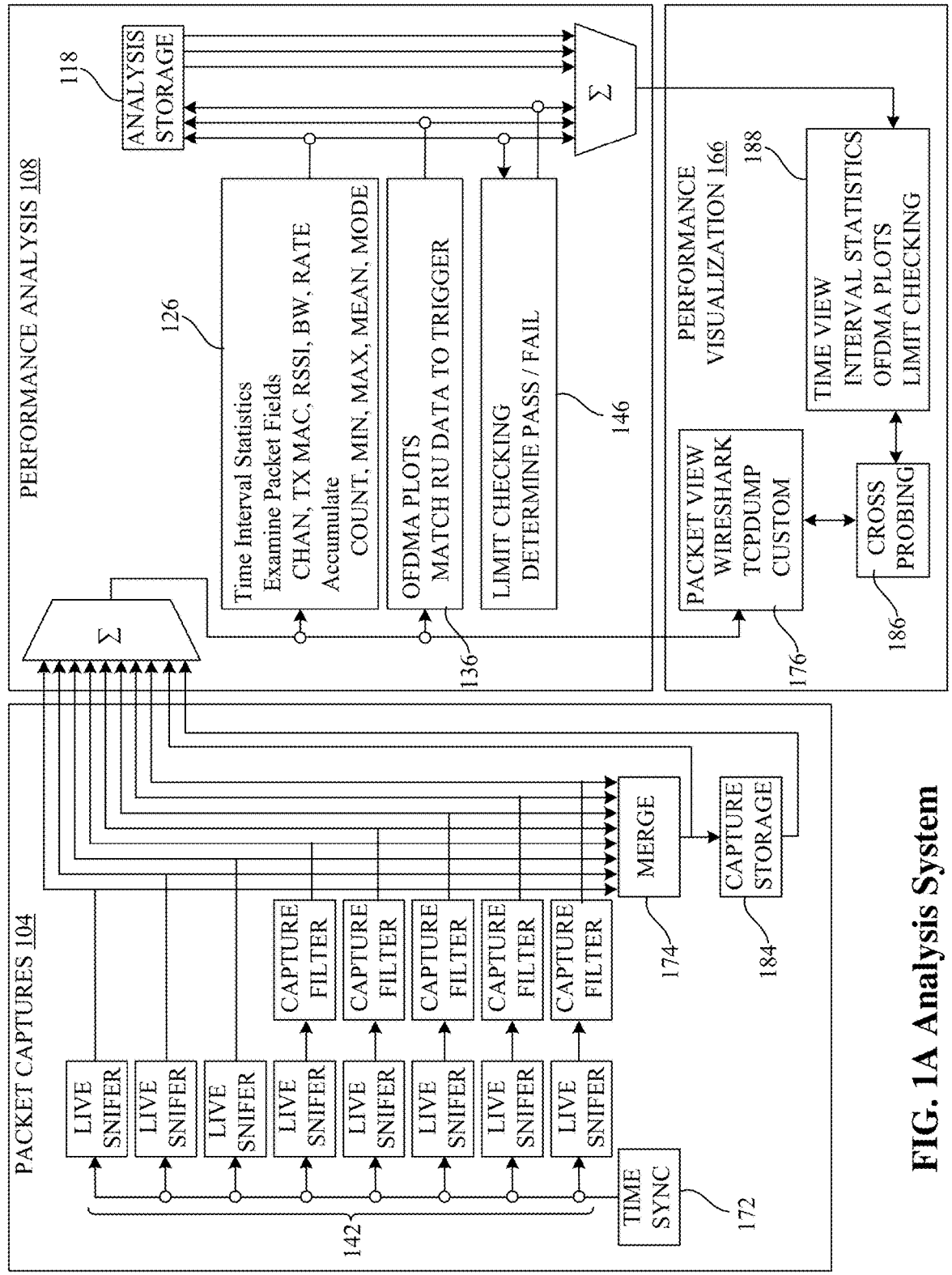
FIG. 1A Analysis System

FIG. 2C Wireshark Reference

| Test Name | Test result measured from KPI sniffer | Reason for failure - sniffer |
|---|---|---|
| KPI test 5GHz release 20230118_36_AX_2_80AD | pass | |
| KPI test 5GHz release 20230118_36_AX_2_20FD | pass | |
| KPI test 5GHz release 20230118_36_AX_1_80AD | fail | ['mode of Rx streams', 'mean value of the Rx Rate'] |
| KPI test 5GHz release 20230118_36_AX_1_20FD | fail | ['mode of Rx streams', 'mean value of the Rx Rate'] |

FIG. 4A

| | | | | |
|---|---|---|---|---|
| # Test Config Name: KPI test 5GHz release 20230118_36_AX_1_80AD | | | | |
| # Application: RVR | | | | |
| # Duration: 45 | | | | |
| # Estiamted Duration: 62[s] | | | | |
| # Settling Time: 2 | | | | |
| # Traffic Pair 1: (Traffic pair 1): From: 192.168.27.24@P6C_5 To: 192.168.15.215@Android Phone | | | | |
| ## From 192.168.27.24@P6C_5 | | | | |
| ## To 192.168.15.215@Android Phone | | | | |
| # Pal Endpoint 1 undefined is MODE_AP (undefined@P6C_5) (172.16.27.14) | | | | |
| # Pal Stats Endpoint 1 172.16.27.14 (RADIO_5) | | | | |
| # Attenuation 1 172.16.20.5 QA-A (undefined) | | | | |
| # Attenuation 2 172.16.20.6 QA-B (undefined) | | | | |
| # epMappi | 0 | Android Phone | | |
| # epMapping: Endpoint 2 is P6C_5 | | | 1 | P6c_5 |
| # epMapping: Endpoint 3 is L3C | | | 2 | L3C |
| # tpMappi | 0 | Traffic Pair 1 | | |

FIG. 4B

CSV Format Exported from Expert Analysis after reconstruction from JSON

| Test Run | Time [ms] | palTimeStamp | Test Status | Pal Stats Endpoint 3 RX rate [Mbps] Min | Pal Stats Endpoint 3 RX rate [Mbps] Max | Pal Stats Endpoint 3 RX rate [Mbps] Mode | Pal Stats Endpoint 3 RX Nss Min | Pal Stats Endpoint 3 RX Nss Max | Pal Stats Endpoint 3 RX Nss Mode |
|---|---|---|---|---|---|---|---|---|---|
| 1 | 2000 | 1674838771 | setting | | | | | | |
| 1 | 3000 | 1674838772 | setting | | | | | | |
| 1 | 4000 | 1674838773 | training | | | | | | |
| 1 | 5000 | 1674838774 | training | | | | | | |
| 1 | 6000 | 1674838775 | step (avg) | 1081 | 1201 | 1081 | 2 | 2 | 2 |
| 1 | 7000 | 1674838776 | step (avg) | 1081 | 1201 | 1081 | 2 | 2 | 2 |
| 1 | 8000 | 1674838777 | step (avg) | 1081 | 1201 | 1201 | 2 | 2 | 2 |
| 1 | 9000 | 1674838778 | step (avg) | 6 | 1201 | 1081 | 1 | 2 | 2 |
| 1 | 10000 | 1674838779 | step (avg) | 1081 | 1201 | 1081 | 2 | 2 | 2 |
| 1 | 11000 | 1674838780 | step (avg) | 1081 | 1201 | 1081 | 2 | 2 | 2 |
| 1 | 12000 | 1674838781 | step (avg) | 6 | 1201 | 1201 | 1 | 2 | 2 |
| 1 | 13000 | 1674838782 | step (avg) | 1081 | 1201 | 1081 | 2 | 2 | 2 |
| 1 | 14000 | 1674838783 | step (avg) | 1081 | 1201 | 1081 | 2 | 2 | 2 |
| 1 | 15000 | 1674838784 | step (avg) | 1081 | 1201 | 1081 | 2 | 2 | 2 |
| 1 | 16000 | 1674838785 | step (avg) | 1081 | 1201 | 1081 | 2 | 2 | 2 |
| 1 | 17000 | 1674838786 | step (avg) | 1081 | 1201 | 1081 | 2 | 2 | 2 |
| 1 | 18000 | 1674838787 | step (avg) | 1081 | 1201 | 1081 | 2 | 2 | 2 |
| 1 | 19000 | 1674838788 | step (avg) | 1081 | 1201 | 1081 | 2 | 2 | 2 |
| 1 | 20000 | 1674838789 | step (avg) | 1081 | 1201 | 1081 | 2 | 2 | 2 |
| 1 | 21000 | 1674838790 | step (avg) | 1081 | 1201 | 1081 | 2 | 2 | 2 |
| 1 | 22000 | 1674838791 | step (avg) | 1081 | 1201 | 1081 | 2 | 2 | 2 |
| 1 | 23000 | 1674838792 | step (avg) | 1081 | 1201 | 1081 | 2 | 2 | 2 |
| 1 | 24000 | 1674838793 | step (avg) | 1081 | 1201 | 1081 | 2 | 2 | 2 |
| 1 | 25000 | 1674838794 | step (avg) | 1081 | 1201 | 1081 | 2 | 2 | 2 |
| 1 | 26000 | 1674838795 | step (avg) | 1081 | 1201 | 1081 | 2 | 2 | 2 |
| 1 | 27000 | 1674838796 | step (avg) | 1081 | 1201 | 1081 | 2 | 2 | 2 |

FIG. 4C

| | A | B | C | D | E | F |
|---|---|---|---|---|---|---|
| 1 | Test name | | | | | |
| 2 | Throughput vs Attenuation | | | | | |
| 3 | Attenuation | 0 | 5 | 10 | 15 | 20 |
| 4 | Low | 9 | 9 | 9 | 9 | 9 |
| 5 | High | 11 | 11 | 11 | 11 | 11 |
| 6 | Throughput vs RSSI | | | | | |
| 7 | RSSI | -35 | -35 | -35 | -35 | -35 |
| 8 | Low | 450 | 450 | 450 | 450 | 450 |
| 9 | High | 600 | 600 | 600 | 600 | 600 |
| 10 | ThroughputPercent vs RSSI | | | | | |
| 11 | RSSI | -35 | -35 | -35 | -35 | -35 |
| 12 | Low | 75 | 75 | 75 | 75 | 75 |
| 13 | High | 100 | 100 | 100 | 100 | 100 |
| 14 | DataRate vs RSSI | | | | | |
| 15 | RSSI | -35 | -35 | -35 | -35 | -35 |
| 16 | Low | 590 | 590 | 590 | 590 | 590 |
| 17 | High | 600 | 600 | 600 | 600 | 600 |
| 18 | MCS vs RSSI | | | | | |
| 19 | RSSI | -35 | -35 | -35 | -35 | -35 |
| 20 | Low | 11 | 11 | 11 | 11 | 11 |
| 21 | High | 11 | 11 | 11 | 11 | 11 |
| 22 | RxMCS vs Attenuation | | | | | |
| 23 | Attenuation | 0 | 5 | 10 | 15 | 20 |
| 24 | Low | 9 | 9 | 9 | 9 | 9 |
| 25 | High | 11 | 11 | 11 | 11 | 11 |
| 26 | TxMCS vs Attenuation | | | | | |
| 27 | Attenuation | 0 | 5 | 10 | 15 | 20 |
| 28 | Low | 9 | 9 | 9 | 9 | 9 |
| 29 | High | 11 | 11 | 11 | 11 | 11 |
| 30 | RxStreams vs Attenuation | | | | | |
| 31 | Attenuation | 0 | 5 | 10 | 15 | 20 |
| 32 | Low | 1 | 1 | 1 | 1 | 1 |
| 33 | High | 1 | 1 | 1 | 1 | 1 |
| 34 | RxBandwidth vs Attenuation | | | | | |
| 35 | Attenuation | 0 | 5 | 10 | 15 | 20 |
| 36 | Low | 80 | 80 | 80 | 80 | 80 |
| 37 | High | 80 | 80 | 80 | 80 | 80 |

473 (rows 30–33)

FIG. 4D

PACKET CAPTURE BASED WI-FI PERFORMANCE ANALYSIS

PRIORITY

This application claims the benefit of and priority to U.S. Provisional. Application No. 63/307,973, titled "Packet Capture Based Wi-Fi Performance Analysis," filed 8 Feb. 2022. This provisional application is incorporated by reference.

RELATED APPLICATION

This application is related to the following commonly owned application U.S. patent application Ser. No. 16/515,786, titled "System and Method for Synchronizing Protocol Analyzers During Wireless Testing", filed Jul. 18, 2019, now U.S. Pat. No. 10,893,494, issued Jan. 12, 2021. The related application is hereby incorporated by reference herein for all purposes.

PREVIOUSLY DISCLOSED

Part of the technology disclosed in this application was previously disclosed by applicant in OCTOBOX® Pal-6E, and STApal-6E datasheet, 25 pages (created Feb. 23, 2022) <accessed at hxxp:www.spirent.com/assets/u/datasheet-octobox-pal-6e-and-stapal-6e>, which is incorporated by reference and submitted with an Information Disclosure Statement. This prior disclosure is identified in accordance with MPEP 2153.01(a) & 608.01(a) and 37 CFR 1.77(b)(6).

FIELD OF THE TECHNOLOGY DISCLOSED

The technology disclosed relates to packet capture based Wi-Fi performance analysis. More specifically the disclosed technology provides real time and post-test visualization and analysis of Wi-Fi performance and behavior of a device under test in wireless communication with a selected Wi-Fi test device.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The Wi-Fi industry is going through major and rapid technology evolutions, enabling many new residential and enterprise use cases. With new Wi-Fi technologies such as Wi-Fi 6 and Wi-Fi 6E, testing is more important than ever before, but the complexities and challenges of testing can become overwhelming for any organization. A need exists for testing throughput and bandwidth and other performance measures during the many phases of product and network life cycles, especially for deploying next-generation Wi-Fi products and networks quickly and efficiently. A further need exists to track behavior of adaptable devices during a test.

An opportunity arises for analyzing the captured packets of a Wi-Fi communication network for determination of the performance of the network devices. Better, more easily operated, more resilient and transparent consumer experiences and systems may result.

SUMMARY

The technology disclosed relates to creating a real time and post-test visualization and analysis of Wi-Fi performance and behavior of a DUT in wireless communication with a selected Wi-Fi test device, including performing a radiated test of the DUT using transceiver signals from multiple test antennas impinging on antennas of the DUT, capturing packet details of traffic between the DUT and the selected Wi-Fi test device using a sniffer that is RF coupled to antennas of the selected Wi-Fi test device, and generating a time series summary stream in real time from the packet details captured by the sniffer, including summaries of both performance and behavior metrics. The performance metrics summarize throughput and other measured characteristics of a received signal and the behavior metrics capture transmitter and/or receiver settings that the DUT and the Wi-Fi test devices each choose. Also disclosed are generating scrolling visualizations of selected metrics from the time series summary stream as the radiated test proceeds, in one scenario, and storing the time series summary stream as the radiated test proceeds, then, in another scenario, post-processing the stored time series summary stream to generate reports, to replay visualizations in revised formats or to apply pass/fail processing.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1A illustrates a block diagram of a representative system for creating a real time visualization and analysis of Wi-Fi performance and behavior of a device under test in wireless communication with a selected Wi-Fi test device, according to one embodiment of the disclosed technology.

FIG. 2C lists example packet capture (PCAP) output of live network packet data, as displayed by a network analyzer such as Wireshark.

FIG. 4A lists results of pass-fail analysis of stored capture time series tests measured from key performance indicator (KPI) and deep packet metrics (DPM) sniffer and lists the reason(s) for failure for tests that fail.

FIG. 4B shows the setup configuration for an example test described relative to the disclosed system for creating a real time visualization and analysis of Wi-Fi performance and behavior of a device under test in wireless communication with a selected Wi-Fi test device.

FIG. 4C shows an excerpt of a report of exported data for the example test, in CSV format.

FIG. 4D shows an excerpt of the limits table used in conjunction with the samples of the time interval series from a specific example test, used to complete the performance analysis and determine pass or fail results for the set of metrics.

DETAILED DESCRIPTION

Figure 1B:
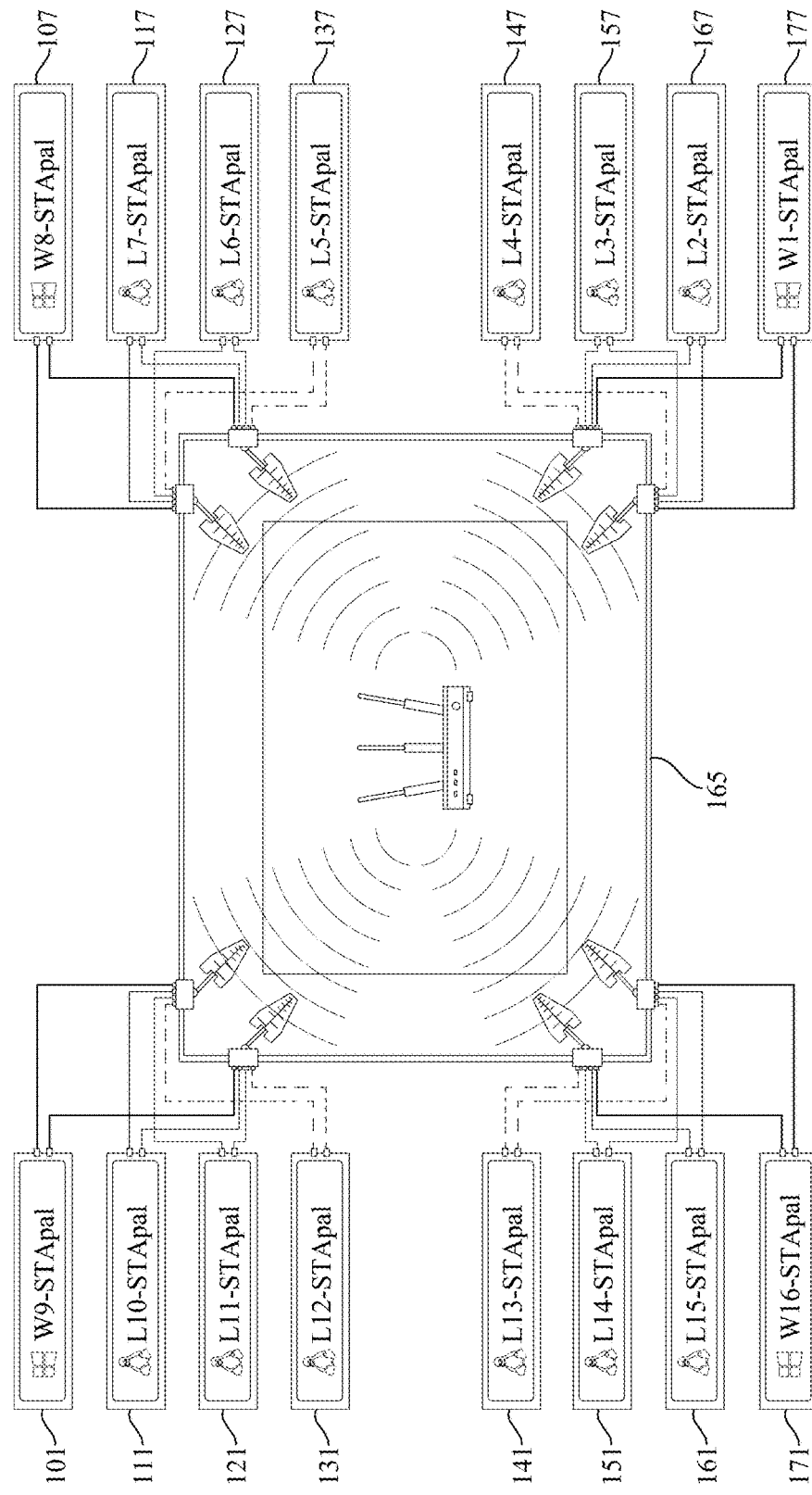
FIG. 1B shows a representative drawing of a set of programmable Wi-Fi test devices, referred to as STApals.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Disclosed is a system comprising hardware, software and processing methods that translate time-synchronized multi-channel Wi-Fi packet captures into performance analysis and performance visualization suitable for applications that can range from troubleshooting and root cause determination to automated regression testing and pass-fail determination.

There exist systems that comprise specialized components which can produce performance analysis data during an active Wi-Fi test session. Some systems take advantage of hardware registers and software readouts in the specialized components to record performance and behavior during tests.

The disclosed technology produces the performance analysis data from the captured packets of a Wi-Fi session. That is, the components in the system that participate in the Wi-Fi session can have their performance data analyzed, regardless of whether the components have special registers or readouts or driver instrumentation of participating devices. This is advantageous especially in the cases in which the performance of a device under test (DUT) in the Wi-Fi session must be determined, and the DUT is a regular Wi-Fi device like a smart phone or an access point (AP). These kinds of regular devices do not typically provide performance analysis data without custom device driver modifications.

The performance analysis process starts with the capture of packets from a Wi-Fi session. There is a large variation of possible packet captures. The simplest example is a packet capture from one sniffer device. Multiple sniffers offer the ability to capture packets from multiple Wi-Fi channels or locations. Packet captures can be live or can be stored and read back later. U.S. Pat. No. 10,893,494, "System and Method for Synchronizing Protocol Analyzers During Wireless Testing", incorporated by reference herein for all purposes, describes advantageous and desirable packet capture, which is trademarked as "synchroSniffer". The synchroSniffer system comprises multiple sniffer devices, each time-synchronized to a reference clock or time base and capable of independent packet filtering. The filtering enables individual sniffers to focus on and capture packets from a single device such as a DUT, even if OFDMA is in use. The multiple captures from time-synchronized sniffers can be merged to provide a timestamp-ordered master capture of the Wi-Fi session. Orthogonal frequency-division multiple access (OFDMA) is a feature of Wi-Fi 6 (802.11ax) that allows access points to serve multiple clients at the same time. Multiple access is achieved in OFDMA by assigning subsets of subcarriers to individual users. The performance analysis process translates packet captures into performance and behavior analysis metrics, often referred to as performance analysis. Individual metrics include the values of any packet field, especially fields from the Wi-Fi radiotap header, and include values derived from sets of related packets such as a count of packets with a matching source MAC address. Radiotap is a de facto standard for 802.11 frame reception and injection. The format for a captured packet also includes other headers such as 802.11 radio information, internet protocol (IP) and transmission control protocol (TCP). The metrics can change over time during the capture, influenced by each packet. The results of the performance analysis can be stored for later recall.

The intended application of the performance analysis, such as for troubleshooting or for automated regression, determines which performance and behavior analyses need to be processed to transform the packet captures. The following parameters MCS, RSSI, and NSS are examples of behavior and performance metrics that can be determined from captured packets.

Modulation Coding Scheme (MCS) is a Wi-Fi transmitter setting or behavior. The method used by the transmitter controller to choose a specific MCS for a packet is complicated and dynamic, and can result in different settings over the course of a stream or session. Generally speaking, the signal to noise ratio (SNR) of the Wi-Fi medium affects the MCS choice. A better quality medium provides higher SNR, and this allows higher MCS to be used successfully.

Received Signal Strength Indicator (RSSI) is a measurement of the power present in a received radio signal, which is a performance metric. RSSI is measured in dBm which is an absolute power level, with 0 dBm equal to 1 milliwatt. RSSI is a measurement of how well a device can hear a signal from a Wi-Fi device, which is useful for determining whether enough signal is available to get a good wireless connection.

Number of Spatial Streams (NSS) is a Wi-Fi transmitter setting for spatial diversity, another behavior. The NSS is limited by the number of antennae that the transceivers are connected to, also referred to as the antenna diversity. Each spatial stream transmits an independent portion of the data packet, allowing reuse of the frequencies selected by the MCS and thereby increasing the data rate. NSS 2 has double the data rate of NSS 1 and NSS 3 has triple the rate.

For one disclosed performance analysis transform, captured packets are transformed into a time interval series of statistics. For example, the interval could be one second. For each one second series of samples in the time interval, summary statistics could be the RSSI mean, bandwidth mode, rate maximum, and stream count minimum. The metrics from each packet within an interval are summarized into a single statistic or set of statistics per metric that represent the variation of the metric during the interval. The interval could be any value including a period smaller than the time it takes to transmit a packet, meaning that each individual packet is represented instead of summarized statistically. A relatively short summary interval can be advantageous for drill down during replay without repeating summarization of captured packets.

For another disclosed performance analysis transform, the captured packets are combined into a series of recombined OFDMA frames. The challenge in this process is that an individual sniffer is capable of receiving data only from a portion of the frequency bandwidth of the Wi-Fi channel. That portion is defined as a sequence of resource units (RU), and these RUs are allocated to a receiving device by a Wi-Fi access point. The sniffer tunes in to this sequence of RUs within a Wi-Fi channel. Multiple simultaneous captures using sniffers with differing sequences of RUs are recombined to produce the result.

A pass-fail performance analysis that is advantageous for automated regression involves processing the samples of a time interval series against defined limits or ranges for the metrics. If a statistic is outside the limits set, the test fails.

Performance visualization is the process of presenting summary metrics, or even statistics from raw captured packets, for human interpretation. Review of stored or real time streams of metrics can help to identify the sources that contribute to any unexpected results such as lower than expected utilization of the available Wi-Fi capacity or inability to achieve maximum expected rate or bandwidth for a selected portion of the Wi-Fi session.

The power of performance visualization is realized when using live packet capture and live performance analysis. Then it is possible to dynamically change Wi-Fi session controls, packet capture controls, or performance analysis to view the effect upon the visualized performance metrics. For example, if the desired throughput for a traffic pair is not being reached, altering behavior of the traffic endpoints may lead to the desired result.

FIG. 1A shows an example system 100A for analyzing the captured packets of a Wi-Fi communication network to determine how a specific device or set of devices is performing. This performance is often considered in comparison with an expectation of performance. In one example, system 100A could be utilized for analyzing, in real time, packet capture from two sniffers (eight are depicted) to generate interval statistics plots for two other regular network devices, such as a phone and an access point (AP) that are participating in a throughput test.

Continuing the description of FIG. 1A, system 100A includes packet captures 104, performance analysis 108 and performance visualization 166. Packet captures 104 include live sniffers 142 with a time synchronizer 172 and capture filters to capture packet data from devices under test, merged live sniffer packets 174, and stored sniffer packets 184. Performance analysis 108 utilizes the captured packets from packet captures 104 to generate time interval statistics 126, generate specialized OFDMA plots 136 matching RU data to trigger data, and perform limit checking 146. Limit checking 146 can process the samples of a time interval series along with a definition of limits or ranges for the metrics, for determining pass or fail results for a metric or set of metrics. Time interval statistics 126, OFDMA plots 136 and limit checking 146 results get stored in analysis storage 118 and passed to performance visualization 166. Performance visualization 166 utilizes performance analysis data from performance analysis 108 to generate time view 188 and captured packets from packet captures 104 to generate packet view 176. Time view 188 supports time interval statistics 126, OFDMA plots 136, and limit checking 146. Performance visualization 166 utilizes performance analysis data from performance analysis 108 to generate custom packet views and can support Wireshark and 'tcpdump' views.

Performance visualization 166 can be extended by cross-probing 186, which refers to navigation among summary scrolling visualization and packet detail views, while retaining a time context of the data being viewed. For instance, the time interval view 188, packet view 176 of selected packet data, and raw packet view as provided by 'TCPDump'. The cross-probing process synchronizes the time point viewed in the time view 188 with the packet viewed in the packet view 176 or the raw packet view. Cross-probing begins with a selected time point, for example a dropout in the RSSI metric of the time interval statistics 126 in the time view 188. Cross-probing (186) from the time interval view (188, shown as a trace in FIG. 2A) to the packet view can be implemented from a summary trace view (188) to look at selected fields from packets summarized by points in the trace. Cross-probing enables switching of views with automatic synchronization of time positions within the data across views. Similarly, the disclosed technology enables selection of a packet in the packet view, then invoking the cross-probe; and returning to the trace at the position in the time interval series that summarizes the selected packet. A request for cross-probing, during or after the test, uses a point in time selected from one of the visualizations to open a per-packet view of some fields in individual packets in the traffic, as disclosed. During a test, cross-probing can freeze or at least slow scrolling visualization while the user is studying packet level data.

Additionally, a drill down request is disclosed for more detailed time series summary data, which may include reprocessing and re-summarizing the capture packet details of the traffic. Drilling down can switch between a visualization summary period of 2.0 seconds to a higher resolution of 0.5 seconds interval. In a slow motion playback, drilling down could extend to scrolling through individual packets. Alternatively, a drill down request for more detailed time series summary data could include reprocessing and re-summarizing the capture packet details with a summary period of 5-100 milliseconds. At short intervals, slow motion playback can be easier for the eye to follow than real time playback.

Note that each time point in the scrolling time view can represent an interval or multiple intervals. The jump to the packet view will cause display of the beginning of the interval since the packet view has a finer time resolution than the time view. Another aspect of the disclosed technology is the ability to use cross-probing to open another time view in which the interval is a period smaller than the time it takes to transmit a packet and each packet is represented.

FIG. 1B shows a representative drawing 100B of a set of programmable Wi-Fi client stations, referred to as STApals, that actively participate in tests or act as sniffers. The configurable STApal wireless test instruments, which include radios, can operate as Wi-Fi stations, capture test traffic and report advanced statistics are connected to high-gain antennas. In this figure, one test participant STApal (e.g., 101) and three sniffer STApals (e.g., 111, 121, 131) are each connected to the pair of antennas in the corners of chamber 165. In the setup illustrated, separate traffic end points could be targeted by each STApal sniffer, and when the test starts, test traffic would be collected or sniffed by the three STApals.

Figure 1C:
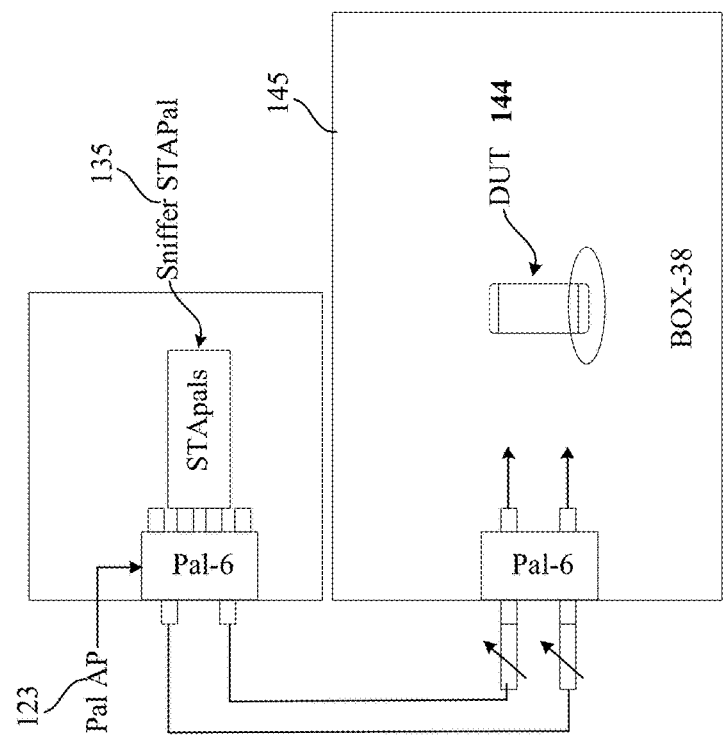
FIG. 1C shows an example test setup block diagram, with Pal access point (AP), sniffer STAPal and a phone as DUT.

FIG. 1C shows a simplified example test setup block diagram 100C, with Pal access point (AP) 123, multiple sniffer STAPals 135 and BOX-38 145 that holds phone 144 as the DUT. For regression tests, Pal-6 programable access point 123 is set up and interacts with phone 144. Test coverage for different traffic settings is achieved by looping through different Wi-Fi settings on the Pal-6. For quality assurance (QA) or regression test, the disclosed system can loop through different 802.11 interfaces, bandwidths, number of streams and guard intervals. A sniffer 135 is set to follow a radiated signal on the same channel, and a capture filter is applied to packets captured, using the user interface disclosed and described below. The capture filter can be configured to capture outgoing traffic to and/or incoming from the phone.

Figure 1D:
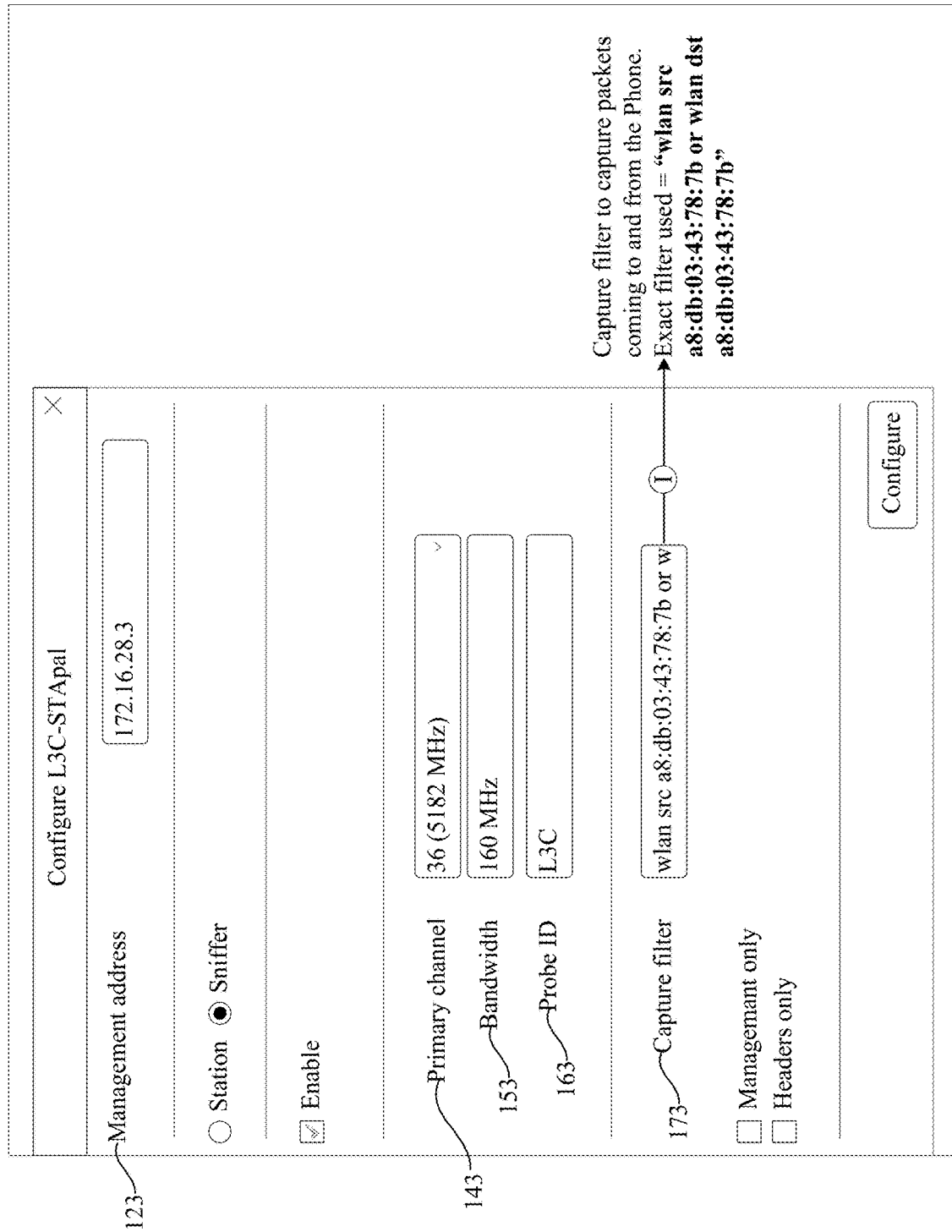
FIG. 1D shows a configuration dialog box for sniffer UI configuration for tests using the disclosed system.

FIG. 1D shows a configuration dialog box for sniffer UI configuration for tests using the disclosed system. In this example, the sniffer gets configured to go into capture mode, for generating a data stream for generating scrolling visualizations of selected metrics from the time series summary stream as the radiated test proceeds, and for storing the time series summary stream as the radiated test proceeds, and post-processing the stored time series summary stream to generate reports, to replay visualizations or to apply pass/fail processing. In this example, L3C sniffer is configured with management address 172.16.28.3 123 with a specific primary channel 143, bandwidth 153, and probe ID 163. Capture filter 173 is configured to capture packets coming to and from the phone. The filter used is "wlan src a8:db:03:43:78:7b or wlan dst a8:db:03:43:78:7b", in this example.

Figure 2A:
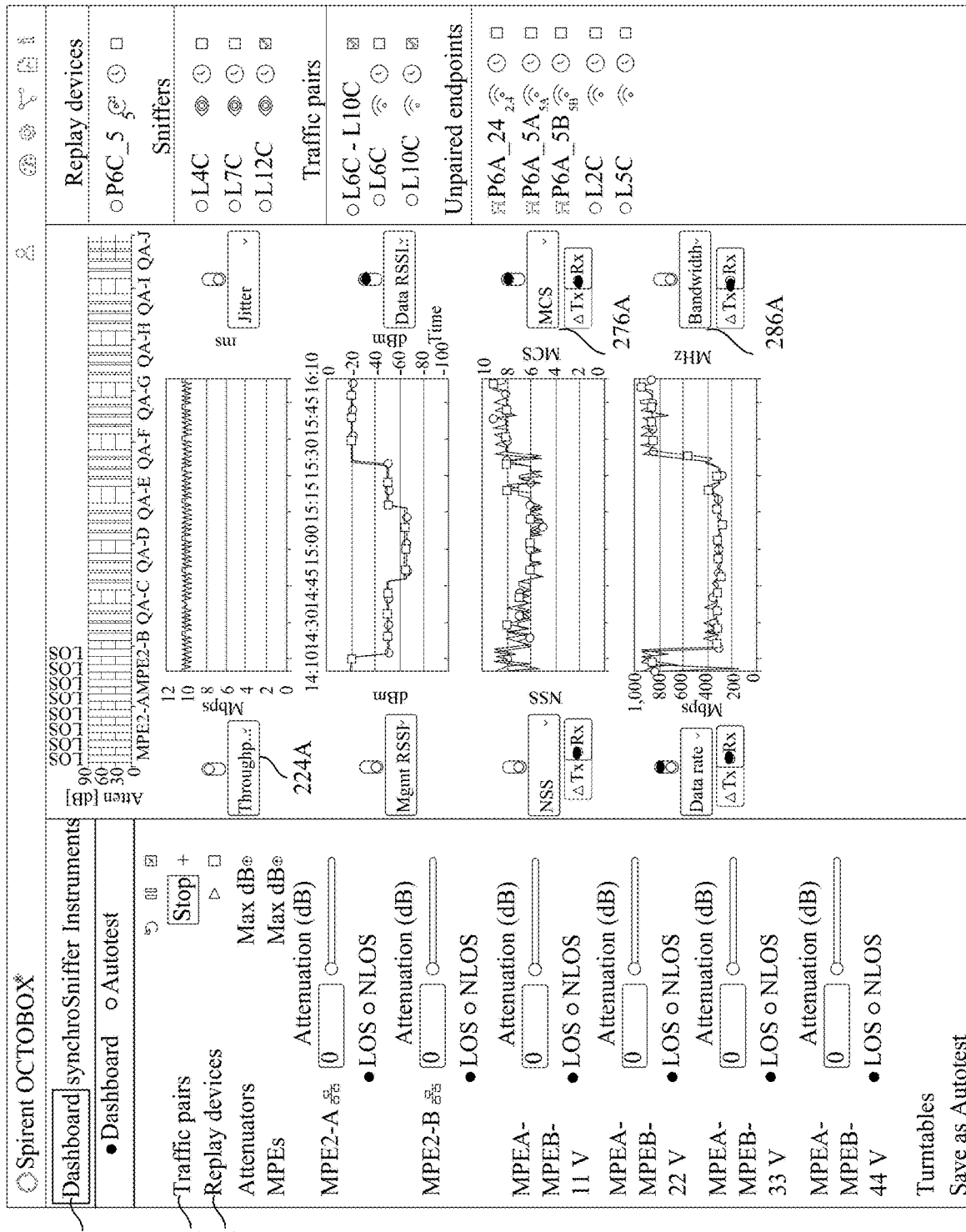
FIG. 2A illustrates an example dashboard for configuring tests, and for performance visualization related to analyzing the captured packets of a Wi-Fi communication network in a representative user interface (UI).

FIG. 2A illustrates an example dashboard 200A for configuring tests and for visualizing performance based on summaries and analysis of captured packets. The dashboard 211 is usable to control attenuation and traffic: the left panel depicts, for MPEs, six attenuation slider controls accompanied by line-of-sight and non-line-of-sight radio buttons. In this example, the attenuation controls are set to zero for no attenuation. Available controls in the left panel under the dashboard tab also include dashboard and autotest radio buttons; player controls for test and/or replay; traffic pairs; replay devices, attenuators; MPEs (expanded); turntables; and save as autotest. The right panel can be used to select which devices plot their data on the scrolling graphs, indicating configuration of the scrolling display of test results. In the right panel, replay devices, sniffers, traffic pairs, and unpaired endpoints are enumerated and status icons provided. Check boxes are provided for configuration of the center panel scrolling displays. As shown, the devices graphed in scrolling visualization of the middle panel are configured by the selected check boxes: traffic end point L10C and sniffer L12C are graphed. Each of the selected devices is live, either watching or participating in a Wi-Fi connection, and successfully synchronized to the reference time base, as indicated by the icons.

In the middle panel illustrated, there is an attenuation indicator and four scrolling graphs. Other visualizations or more or fewer scrolling visualizations could be provided. The attenuation indicator shows that all depicted attenuation levels have been set to zero. On the four scrolling visualizations, the metrics selected by the slider switches on the sides of the visualizations are throughput, data RSSI, MCS of the receiver 276A and data rate of the receiver 286A. On each visualization, two separate metrics can be displayed. The metrics can be selected using pull down menus such as 224A, in case different metrics than those offered are of interest to the user. In the data RSSI graph, the signal strength varied from −20 to −70 dBm, which would reflect some test setting. Responsively during the test, the selected MCS varied from 5 to 9, using lower values during weak signal intervals and higher settings during stronger signal intervals. The impact on data range is shown in the bottom scrolling visualization.

The scrolling visualizations can be shown during a live test or by replay of a previously conducted test or test segment. During replay a user may use a tool to drag a time series in a scrolling visualization to select the placement of data being visualized.

Figure 2B:
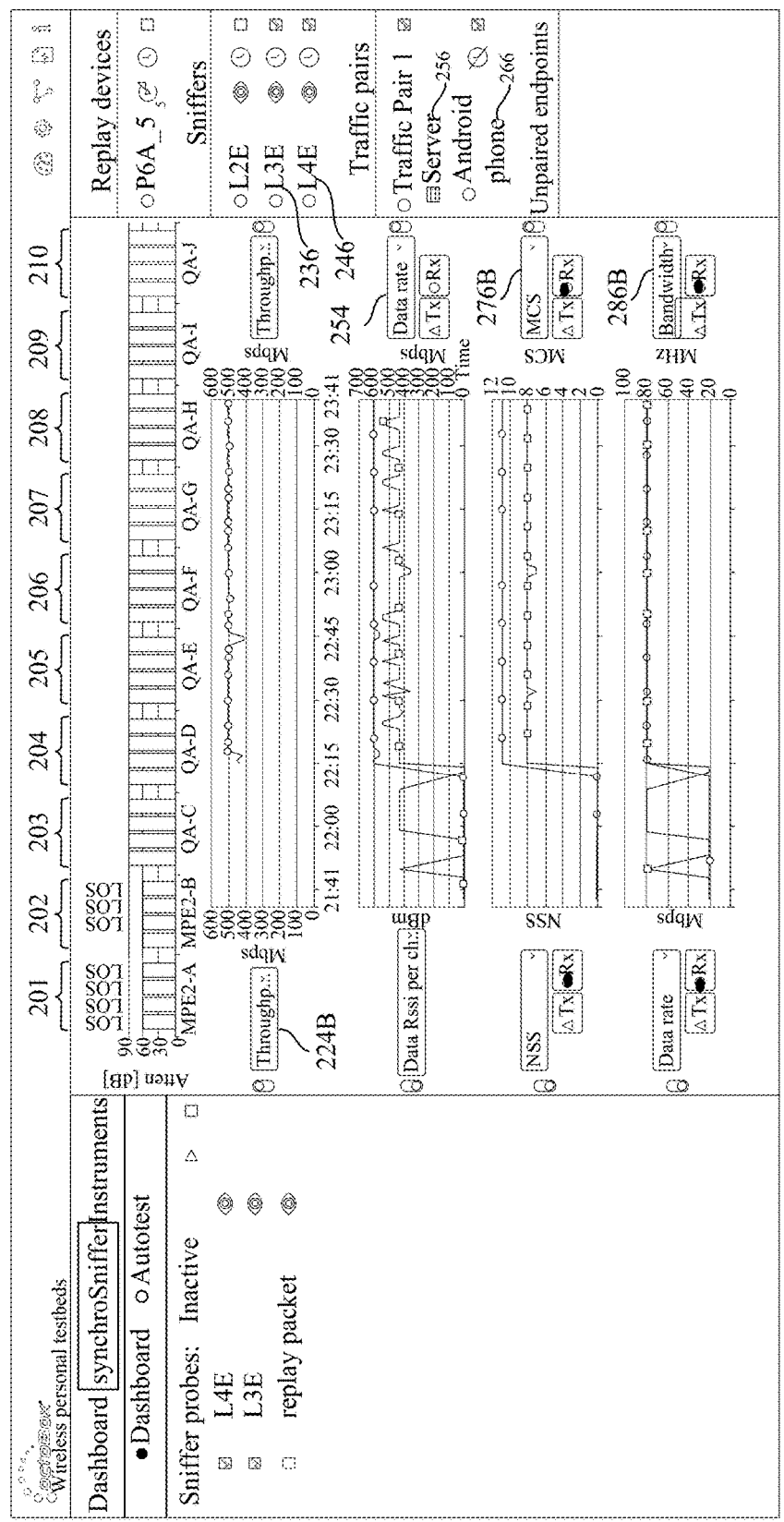
FIG. 2B illustrates synchroSniffer performance visualization related to analyzing the captured packets of a Wi-Fi communication network in a representative UI.

FIG. 2B illustrates the tab for synchroSniffer performance visualization 200B for selecting which sniffers to start and stop, for analyzing the captured packets of a Wi-Fi communication network. This figure switches the visualization from the dashboard tab to the synchroSniffer tab in the left panel. The live sniffer probes, indicated by checkboxes in the left panel, are L3E device 236 and L4E device 246. As in the dashboard tab, the right-hand side for synchroSniffer tab can be used to select which devices plot their data on the scrolling graphs, so both tabs share the same visualization. Replay device P6A_5 is selected in the right panel. The traffic pair 1 is selected, including the Android phone. Replay devices, sniffers and traffic pairs available for scrolling visualization are shown in the right panel. Each of the sniffers has a capture filter set to match the source media access control (MAC) of a traffic endpoint such as a Server 256 or Android phone 266, as shown in the example visualization. In the example shown, 500 Mb/sec of data 224B is transferring between the traffic endpoints. The captured packets from the live captures are transformed to show scrolling time interval series metrics including data rate 254, MCS 276B and bandwidth 286B, with Tx representing transmit and Rx representing Receive. The bars at the top of performance visualization 200B show the attenuator settings for each channel of eight four-channel RF attenuators QA-x 202, 203, 204, 205, 206, 207, 208, 209, 210 and two multi path emulator devices (MPE-2) 201, 202. In one implementation, the four-channel RF attenuators are Spirent quadAtten (QA-x) attenuators. MPE-2 in this example refers to a 2nd generation Spirent four channel device that includes a four-channel attenuator. Different attenuators can be used in another implementation.

Each data point connected in the graph represents one second of received data packets in one implementation. In the figure, equally spaced markers are indicated by the time scale under the first graph to be ten seconds apart. In one example graph, Rx data is indicated using circle markers. If Tx data were selected instead, the graph markers would be triangles. (In the drawing, squares are used to enable differentiation between the two graphs shown on the same axes.) The test starts at about 22:15 and runs for about 100 seconds. The disclosed technology enables the user to review summarized packet data either in real time or by replay.

In some use cases, the performance visualization can illustrate a problem that depends on an incorrect, incomplete, or unexpected packet exchange sequence between Wi-Fi session members. Consider a test in which visualization were to show data throughput suddenly dropped from normal to zero, while the RSSI values near that time looked stable. Having a variety of metrics to look through would allow a user to visually correlate changes in system settings and throughput. In contrast, using existing network packet analyzers such as Wireshark could be cumbersome and tedious.

Figure 2C:
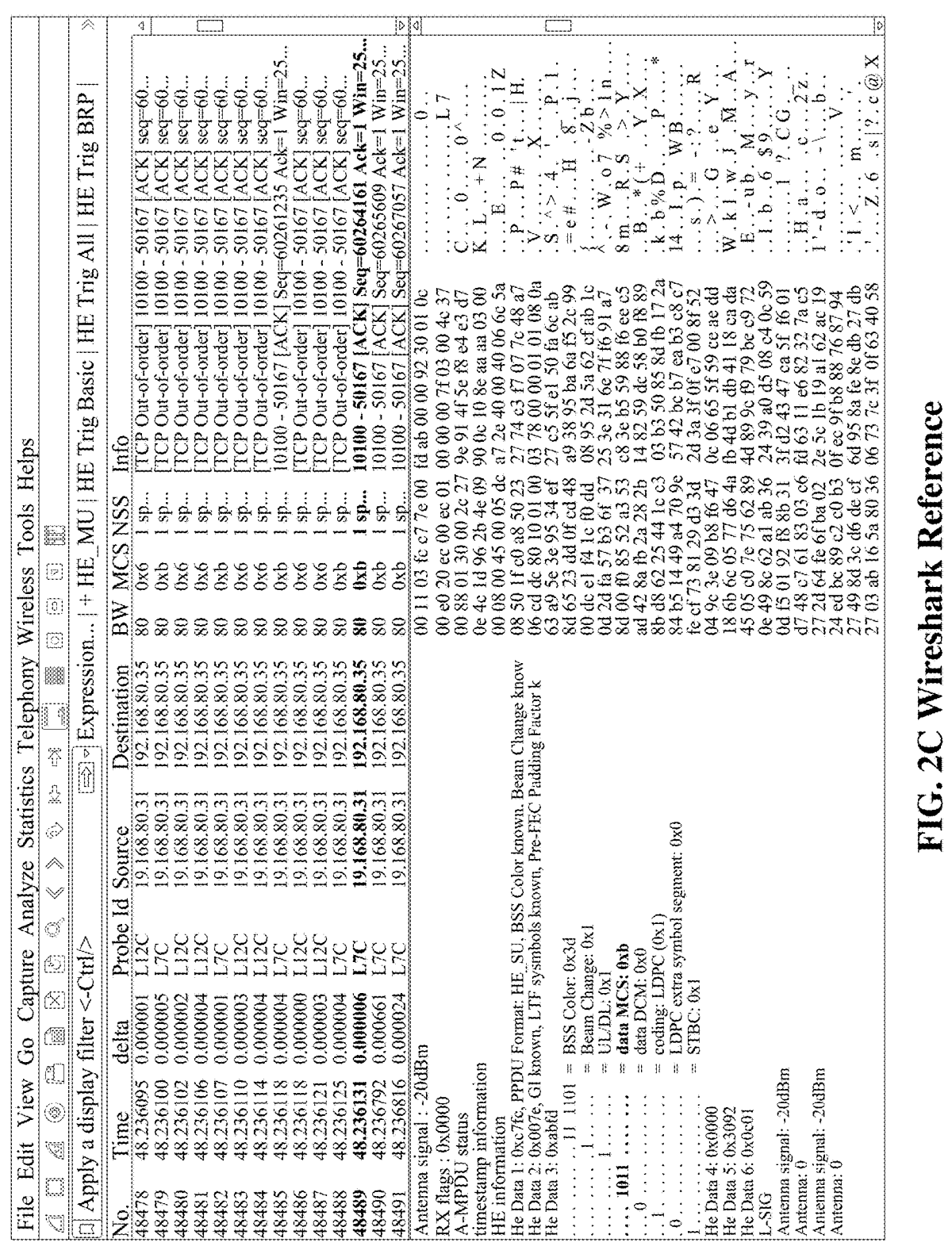

FIG. 2C lists example packet capture (PCAP) output of live network packet data, as displayed by a network analyzer such as Wireshark.

We disclose a visualization tool for performance analysis, using a summarizer that transforms packet captures into a time series of interval statistics. There are multiple possible methods of implementing the transform process, as we describe next.

Figure 3:
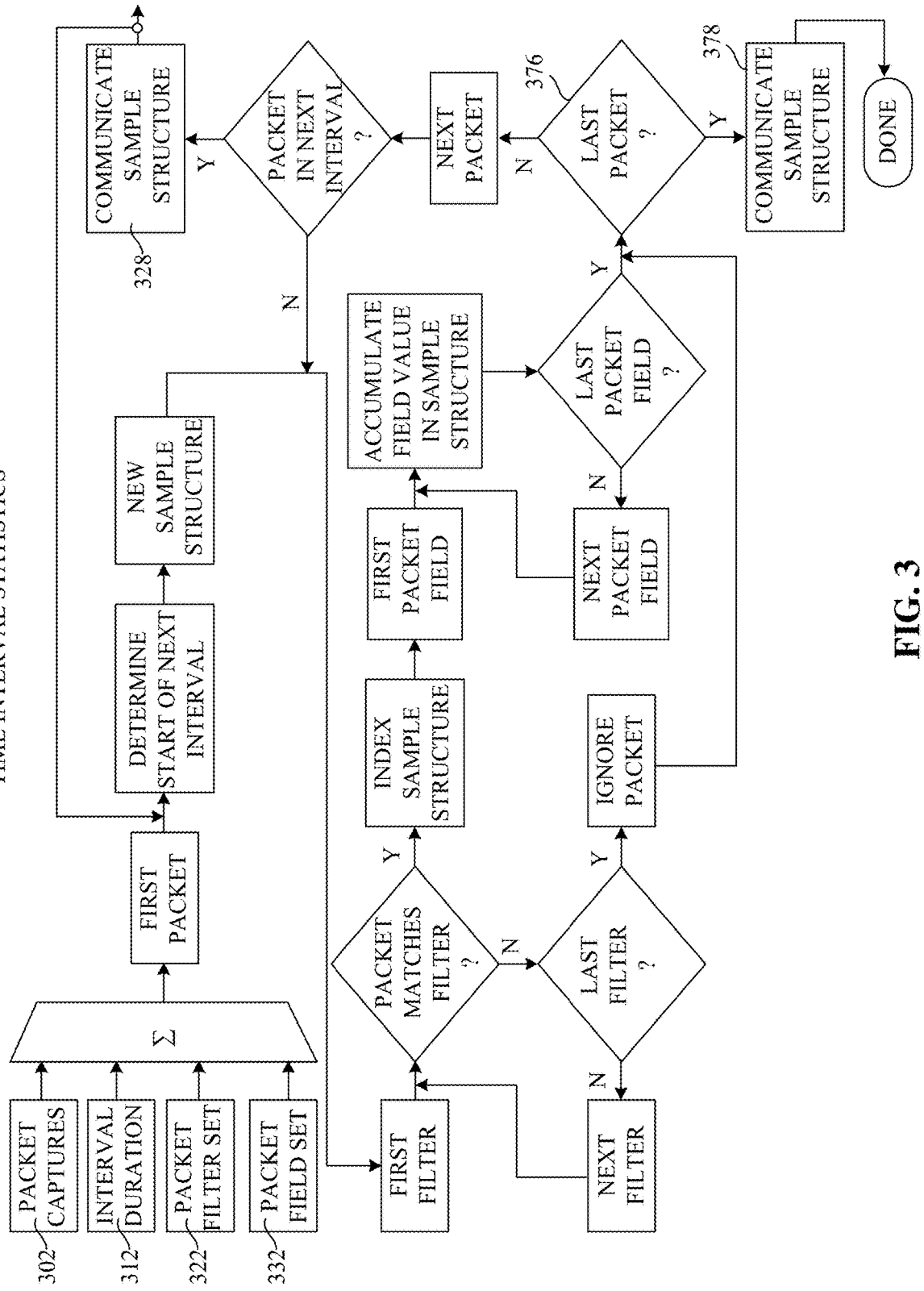
FIG. 3 illustrates performance analysis workflow from captured packets to time interval statistics for the disclosed technology.

FIG. 3 illustrates performance analysis workflow 300 from packet captures to a time series of interval statistics. The metrics to process, interval for summarization and filters to apply are specified before starting. The specific sniffer sources within the packet captures 302 get identified, and the interval duration 312 is provided. The time series of metrics are grouped by definitions in packet filter set 322, to select the appropriate streams of packets between device pairs for analysis. Metrics to summarize can be specified in a packet field set 332. The field set can specify how to summarize fields over the interval duration, such as minimum, maximum, average, standard deviation, mode, sum or other.

Workflow 300 produces sample structures 328 that summarize metrics over intervals. A sample structure can be an array or list for a metric, with a time identifier that ties metrics to specific time intervals, using a reference time base. As the sample structures are produced, they are communicated to a higher layer of control that determines how to store or forward the time interval series samples. Examples include storing in an array or file and streaming the samples to a process that accepts the live stream as input.

The transform process loops through the packets, finds for each packet the matching time interval series packet filter, then loops through the set of packet field transform definitions. Each selected packet field value is accumulated to update the statistics in the single packet sample structure 328. When a new interval is started, the sample structure is communicated to the higher layer and a new sample structure is prepared. The process continues until the last packet 376 is transformed and the last sample structure 378 is communicated to the higher layer.

One overall motivation for using the statistics derived from captured packets is to determine how a specific device or set of devices is performing, often considered against an expectation of performance.

In a throughput test, typically, the device under test (DUT) is paired with a test device that has known good performance that is configured to run a throughput test, ramping up over a throughput range. The throughput test exchanges packets between the paired devices at the maximum possible transfer rate or a fixed rate. Three test scenarios include 1) determination of maximum performance, 2) determination of impaired performance, and 3) a roaming scenario in which the DUT is forced to associate to a new access point (AP) because the original AP signal has become too weak. Scenario 3) involves ramping attenuator values to simulate the original AP getting farther away and weaker, and the new AP getting closer and stronger.

In one disclosed scenario, once the AP and phone are connected, iperf3 TCP traffic is started, originating from the AP and terminating at the phone, and running traffic for forty-five seconds. Slightly after traffic is started, the sniffer gets started. While the sniffer streams captured packets into Wireshark, it also generates 802.11 statistics in real time, including but not limited to RSSI, MCS, number of streams (NSS), bandwidth, data rates and other metrics, in one second intervals. The user interface generates scrolling graphs that update in one second intervals. The test configuration and the data from the sniffer are stored in a test record with summary statistics generated by the sniffer, on a server and are available for post-processing once the test is done or even while a test continues to run. Post-processing the stored time series summary stream can generate reports, replay visualizations or apply pass/fail processing. FIG. 2B, described above, shows KPI statistics generated during a test run.

Tests can be pre-configured and run in so-called autotest mode. The dashboard UI can be used for configuring and saving, then selecting and running the pre-configured autotests.

Once the test is done, the disclosed system presents API calls to download the raw data in JSON format, which is saved in the results folder, and can also save the raw PCAP file in the results folder for verification. The JSON file is then fed to the disclosed analysis tool, which has the following functions. (1) Convert the JSON file to CSV so the raw data from the test can be readily manipulated, for instance using a spreadsheet. (2) Further analyze the data from the CSV file, to determine and report the average data for the test run, for the Wi-Fi statistics, including data rate, MCS, number of streams and bandwidth. This average data can be stored in the value field in the "limit_test_details.json" file. (3) Based on the configured Wi-Fi settings for running the test, load a limits file against which to compare the details file. For instance, the limits file can be a CSV file called 'limits_<testname>.csv' and can include the upper and lower limits for the Wi-Fi statistics, including data rate, MCS, number of streams and bandwidth. (4) The analysis tool compares the "value" generated in (2) against the upper and lower limits loaded from 'limits_<testname>.csv'. (5) The results of the comparison are stored in 'limit_test_details.json'. The disclosed system checks to see whether limit checking for the Wi-Fi statistics have passed. If they have, the test is flagged as a 'Pass', but if one or more Wi-Fi statistics failed the limit check, the test is flagged as 'Fail'. The value, upper limit, lower limit, and pass-fail determination can be output in JSON or another format for each metric or statistic for which limits have been assigned.

FIG. 4A lists results of pass-fail analysis of stored capture time series tests measured from the key performance indicator (KPI) and deep packet metrics (DPM) sniffer and lists the reason(s) for failure for tests that fail. Two tests pass: KPI test named 5 GHz release 20230118_36_AX_2_80AD 412 and KPI test named 5 GHz release 20230118_36_AX_2_20AD 422, each with two streams, using bandwidths of 80 and 20 MHz, respectively. A third test listed as 5 GHz release 20230118_36_AX_1_80AD 432 fails, as does the fourth test listed as 5 GHz release 20230118_36_AX_1_20AD 442. For the third test 432, reasons for failure 436 include 'mode of Rx streams' and 'mean value of the Rx Rate'.

FIG. 4B shows the setup configuration for the example test named 5 GHz release 20230118_36_AX_1_80AD 432. This example illustrates the use of the results files in interpreting test results. Listed below is the JSON file of values, for an attenuation of zero, and upper and lower limits for various tests included in the single stream KPI test named 5 GHz release 20230118_36_AX_1_80AD 432. This test utilizes the L3C sniffer 464 configured as described above. For analyzing the reason a test result is flagged 'fail', note the 'fail' reasons listed: for 'mode of Rx streams' the value is '2', but the lower and upper limits are '1'. Also, for 'mean value of Rx Rate' the "value": 1107.6666666666667, exceeds both the lower and upper limits, specified in the JSON structure as 'lower': 500.4 and 'upper': 610.4.

A sample JSON report of pass-fail results follows:

```
[
  [
    "KPI test 5GHz release 20230118_36_AX_1_80AD",
    [
      {
        "attenuation": 0,
        "name": "mean throughput",
        "results": "pass",
        "value": 9.76363636363636,
        "lower": 9,
        "upper": 11
      }
    ],
    [
      {
        "attenuation": 0,
        "name": "mode of the Rx MCS",
        "results": "pass",
        "value": 10,
        "lower": 9,
        "upper": 11
      }, ...
    ],
    [
      {
        "attenuation": 0,
        "name": "mode of Rx streams",
        "results": "fail",
        "value": 2,
        "lower": 1,
        "upper": 1
      }, ...
    ],
    [
      {
        "attenuation": 0,
        "name": "mode of Rx BW",
        "results": "pass",
        "value": 80,
        "lower": 80,
        "upper": 80
      }, ...
    ],
    [
      {
        "attenuation": 0,
        "name": "mean value of the Rx Rate",
        "results": "fail",
        "value": 1107.6666666666667,
        "lower": 500.4,
        "upper": 610.4
      }, ...
    ],
    {
      "test result": "fail"
    }
  ]
]
```

FIG. 4C shows an excerpt of a report of exported data for the example test, in CSV format. The report shows data from the completed disclosed analysis, reconstructed from the JSON. Each row in the table shows test status for an interval of time, in this case one second (1000 ms.)

FIG. 4D shows an excerpt of the limits table for the test named 5 GHz release 20230118_36_AX_1_80AD, which holds the limits applied to determine pass or fail results for the set of metrics. The full table includes limit settings for a series of attenuation settings. Note that for the example in this discussion, 'RxStreams vs Attenuation' test 473 shows the same limits as those listed in the JSON file listed above.

In addition to the example described herein, the disclosed system can configure, schedule and perform tests that include multiple streams such as one, two or four streams; multiple bandwidths such as 20, 40, 80 and 160 MHz; and multiple test frequencies such as 2 GHz, 4 GHz, 5 GHz and 6 GHz, and permutations of these test settings.

Computer System

Figure 5:
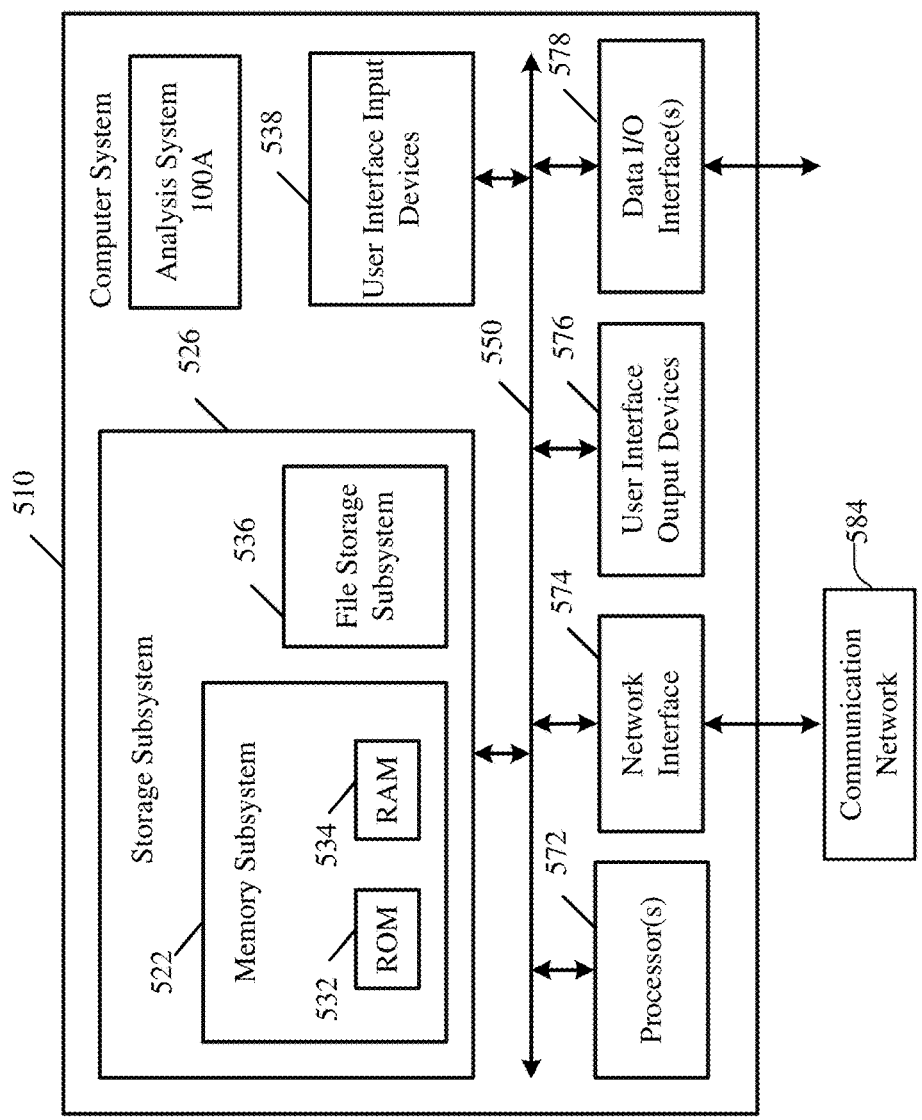
FIG. 5 is a simplified block diagram of an embodiment of a representative system for creating a real time visualization and analysis of Wi-Fi performance and behavior of a device under test in wireless communication with a selected Wi-Fi test device, according to one embodiment of the disclosed technology.

FIG. 5 is a simplified block diagram of an embodiment of a system 500 that can be used for creating a real time visualization and analysis of Wi-Fi performance and behavior of a device under test in wireless communication with a selected Wi-Fi test device. Computer system 510 typically includes a processor subsystem 572 which communicates with a number of peripheral devices via bus subsystem 550. These peripheral devices may include a storage subsystem 526, comprising a memory subsystem 522 and a file storage subsystem 536, user interface input devices 538, user interface output devices 578, and a network interface subsystem 576. The input and output devices allow user interaction with computer system 510 and network and channel emulators. Network interface subsystem 574 provides an interface to outside networks and devices of the system 500. The computer system further includes communication network 584 that can be used to communicate with user equipment (UE) units; for example, as a device under test, and includes analysis system 100A.

The physical hardware components of network interfaces are sometimes referred to as network interface cards (NICs), although they need not be in the form of cards: for instance, they could be in the form of integrated circuits (ICs) and connectors fitted directly onto a motherboard, or in the form of microcells fabricated on a single integrated circuit chip with other components of the computer system.

User interface input devices 538 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 510.

User interface output devices 578 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide nonvisual display such as via audio output devices. In general, use of the term "output device" is intended to include all possible types of devices and ways to output information from computer system 510 to the user or to another machine or computer system. The computer system further can include user interface output devices 578 for communication with user equipment.

Storage subsystem 526 stores the basic programming and data constructs that provide the functionality of certain embodiments of the present invention. For example, the various modules implementing the functionality of certain embodiments of the invention may be stored in a storage subsystem 526. These software modules are generally executed by processor subsystem 572.

Storage subsystem 526 typically includes a number of memories including a main random access memory (RAM) 534 for storage of instructions and data during program execution and a read only memory (ROM) 532 in which fixed instructions are stored. File storage subsystem 536 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 536. The host memory storage subsystem 526 contains, among other things, computer instructions which, when executed by the processor subsystem 572, cause the computer system to operate or perform functions as described herein. As used herein, processes and software that are said to run in or on "the host" or "the computer", execute on the processor subsystem 572 in response to computer instructions and data in the host memory storage subsystem 526 including any other local or remote storage for such instructions and data.

Bus subsystem 550 provides a mechanism for letting the various components and subsystems of computer system 510 communicate with each other as intended. Although bus subsystem 550 is shown schematically as a single bus, alternative embodiments of the bus subsystem may use multiple busses.

Computer system 510 itself can be of varying types including a personal computer, a portable computer, a workstation, a computer terminal, a network computer, a television, a mainframe, or any other data processing system or user device. Due to the ever-changing nature of computers and networks, the description of computer system 510 depicted in FIG. 5 is intended only as a specific example for purposes of illustrating embodiments of the present invention. Many other configurations of computer system 510 are possible having more or less components than the computer system depicted in FIG. 5.

Some Particular Implementations

We describe various implementations of creating a real time visualization and analysis of Wi-Fi performance and behavior of a DUT in wireless communication with a selected Wi-Fi test device, for determination of the performance of the network devices, in the following paragraphs.

One implementation includes a disclosed method for creating a real time visualization and analysis of Wi-Fi performance and behavior of a device under test, DUT, in wireless communication with a selected Wi-Fi test device. The method disclosed includes performing a radiated test of the DUT using transceiver signals from multiple test antennas impinging on antennas of the DUT, capturing packet details of traffic between the DUT and the selected Wi-Fi test device using a sniffer that is RF coupled to antennas of the selected Wi-Fi test device, and generating a time series summary stream in real time from the packet details captured by the sniffer, including summaries of both performance and behavior metrics. The performance metrics summarize throughput and other measured characteristics of a received signal and the behavior metrics capture transmitter settings that the DUT and the Wi-Fi test devices each choose. The method also includes generating scrolling visualizations of selected metrics from the time series summary stream as the radiated test proceeds.

Another implementation includes a disclosed method for generating real time summary data from Wi-Fi performance and behavior of a device under test, DUT, in communication with a selected Wi-Fi test device, and post-processing the real time summary data. The method includes storing the time series summary stream as the radiated test proceeds, and post-processing the stored time series summary stream to generate reports, to replay visualizations or to apply pass/fail processing.

This method and other implementations of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

Some implementations further include capturing the packet details on different Wi-Fi channels using multiple synchronized sniffers. Other implementations include assembly of Wi-Fi orthogonal frequency-division multiple access (OFDMA) frames from captured packets received using multiple time synchronized sniffers.

Many implementations further include post-processing assembly of Wi-Fi OFDMA frames from captured packets received using multiple time synchronized sniffers.

Some implementations of the disclosed method further include generating a pass or fail determination, based on application of thresholds to metrics in the stored time series summary stream.

Some implementations include captured packets being generated in real time. Other implementations include captured packets being recalled from storage.

Many implementations include generating the time series summary stream periodically with a period of 0.1 to 2.0 seconds. Some implementations also include visualization of metrics as a plot of metrics versus time.

Some implementations of the disclosed method further include receiving a drill down request for more detailed time series summary data, reprocessing and re-summarizing the capture packet details of the traffic, and responsively switching the scrolling visualization from a summary period of 0.5 to 2.0 seconds down to a summary period of 5-100 milliseconds.

Some implementations of the disclosed method also include receiving a drill down request for more detailed time series summary data, reprocessing and re-summarizing the capture packet details of the traffic, and responsively switching the visualization from a summary period of 0.5 to 2.0 seconds down to individual packets.

Many implementations include receiving a request for cross-probing, during or after the test, and using a point in time selected from one of the visualizations to open a per-packet view of some fields in individual packets in the traffic.

Some implementations of the disclosed method further include receiving and acting on a request for cross-probing from a field in a per-packet view of some fields in an individual packet in the traffic, to a historical display that replays a section of the scrolling visualizations, including display of the field in the request.

For some implementations of the disclosed method, the performance metrics summarized include RSSI and throughput and the behavior metrics summarized include DUT transmitter settings for MCS, NSS, and bandwidth used.

For many implementations the scrolling visualizations are for user selectable fields that are changeable in real time during the test, and in many cases, the scrolling visualizations display summary data from two fields on a single graph, with different axis scales on opposing sides of the visualizations. In some implementations, the scrolling visualizations display summary data from two fields on a single graph, with toggle switches for turning the two fields off and on.

Other implementations may include a tangible/non-transitory computer readable storage medium, including storing program instructions loaded into memory that, when executed on hardware, cause the processors to implement actions for creating a real time visualization and analysis of Wi-Fi performance and behavior of a device under test, DUT, in wireless communication with a selected Wi-Fi test device. In this application, a tangible computer readable medium does not include a transitory wave form. The device includes hardware, such as a CPU or other processor, coupled to the computer readable medium.

Yet other implementations may include a system for creating a real time visualization and analysis of Wi-Fi performance and behavior of a device under test, DUT, in wireless communication with a selected Wi-Fi test device, the system including a processor, memory coupled to the processor and computer instructions from the non-transitory computer readable storage media loaded into the memory, according to the preceding computer readable media, described above.

Each of the features discussed in this particular implementation section for the first method implementation apply equally to this system implementation. As indicated above, all the system features are not repeated here and should be considered repeated by reference.

We claim as follows:

1. A method of creating a real time visualization and analysis of Wi-Fi performance and behavior of a device under test, DUT, in wireless communication with a selected Wi-Fi test device including:
    performing a radiated test of the DUT using transceiver signals from multiple test antennas impinging on antennas of the DUT;
    capturing packet details of traffic between the DUT and the selected Wi-Fi test device using a sniffer that is RF coupled to antennas of the selected Wi-Fi test device;
    generating a time series summary stream in real time from the packet details captured by the sniffer, including summaries of both performance and behavior metrics, wherein the performance metrics summarize throughput and other measured characteristics of a received signal and
    the behavior metrics capture transmitter settings that the DUT and the Wi-Fi test devices each choose; and
    generating scrolling visualizations of selected metrics from the time series summary stream as the radiated test proceeds.

2. The method of claim 1, further including capturing the packet details on different Wi-Fi channels using multiple synchronized sniffers.

3. The method of claim 1, further including assembly of Wi-Fi orthogonal frequency-division multiple access, OFDMA, frames from captured packets received using multiple time synchronized sniffers.

4. The method of claim 1, further including generating the time series summary stream periodically with a period of 0.1 to 2.0 seconds.

5. The method of claim 1, further including receiving a drill down request for more detailed time series summary data, reprocessing and re-summarizing the capture packet details of the traffic, and responsively switching the scrolling visualization from a summary period of 0.5 to 2.0 seconds down to a summary period of 5-100 milliseconds.

6. The method of claim 1, further including receiving a drill down request for more detailed time series summary data, reprocessing the capture packet details of the traffic, and responsively switching the visualization from a summary period of 0.5 to 2.0 seconds down to individual packets.

7. The method of claim 1, further including receiving a request for cross-probing, during or after the test, and using a point in time selected from one of the visualizations to open a per-packet view of some fields in individual packets in the traffic.

8. The method of claim 1, further including receiving and acting on a request for cross-probing from a field in a per-packet view of some fields in an individual packet in the traffic, to a historical display that replays a section of the scrolling visualizations, including display of the field in the request.

9. The method of claim 1, wherein the performance metrics summarized include RSSI and throughput and the behavior metrics summarized include DUT transmitter settings for MCS, NSS, and bandwidth used.

10. The method of claim 1, wherein the scrolling visualizations are for user selectable fields that are changeable in real time during the test.

11. The method of claim 10, wherein the scrolling visualizations display summary data from two fields on a single graph, with different axis scales on opposing sides of the visualizations.

12. The method of claim 10, wherein the scrolling visualizations display summary data from two fields on a single graph, with toggle switches for turning the two fields off and on.

13. A non-transitory computer readable medium including program instructions that, when executed on hardware, cause the hardware to implement actions for creating a real time visualization and analysis of Wi-Fi performance and behavior of a device under test, DUT in wireless communication with a selected Wi-Fi test device, the actions including:
    performing a radiated test of the DUT using transceiver signals from multiple test antennas impinging on antennas of the DUT;
    capturing packet details of traffic between the DUT and the selected Wi-Fi test device using a sniffer that is RF coupled to antennas of the selected Wi-Fi test device;
    generating a time series summary stream in real time from the packet details captured by the sniffer, including summaries of both performance and behavior metrics, wherein the performance metrics summarize throughput and other measured characteristics of a received signal and
    the behavior metrics capture transmitter settings that the DUT and the Wi-Fi test devices each choose; and
    generating scrolling visualizations of selected metrics from the time series summary stream as the radiated test proceeds.

14. A device including hardware coupled to the computer readable medium of claim 13.

15. A method of generating real time summary data from Wi-Fi performance and behavior of a device under test, DUT, in communication with a selected Wi-Fi test device, and post-processing the real time summary data, including:
    performing a radiated test of the DUT using transceiver signals from multiple test antennas impinging on antennas of the DUT;

capturing packet details of traffic between the DUT and the selected Wi-Fi test device using a sniffer that is RF coupled to antennas of the selected Wi-Fi test device;

generating a time series summary stream in real time from the packet details captured by the sniffer, including summaries of both performance and behavior metrics,
wherein the performance metrics summarize throughput and other measured characteristics of a received signal and
the behavior metrics capture transmitter settings that the DUT and the Wi-Fi test devices each choose; and
storing the time series summary stream as the radiated test proceeds; and
post-processing the stored time series summary stream to generate reports, to replay visualizations or to apply pass/fail processing.

16. The method of claim 15, further including post-processing assembly of Wi-Fi orthogonal frequency-division multiple access, OFDMA, frames from captured packets received using multiple time synchronized sniffers.

17. The method of claim 15, further including generating a pass or fail determination, based on application of thresholds to metrics in the stored time series summary stream.

18. The method of claim 15, further including generating the time series summary stream periodically with a period of 0.1 to 2.0 seconds.

19. The method of claim 15, wherein the performance metrics summarized include RSSI and throughput and the behavior metrics summarized include DUT transmitter settings for MCS, NSS, and bandwidth used.

20. A non-transitory computer readable medium including program instructions that, when executed on hardware, cause the hardware to implement actions for generating real time summary data from Wi-Fi performance and behavior of a device under test, DUT, in communication with a selected Wi-Fi test device, and post-processing the real time summary data, the actions including:

performing a radiated test of the DUT using transceiver signals from multiple test antennas impinging on antennas of the DUT;

capturing packet details of traffic between the DUT and the selected Wi-Fi test device using a sniffer that is RF coupled to antennas of the selected Wi-Fi test device;

generating a time series summary stream in real time from the packet details captured by the sniffer, including summaries of both performance and behavior metrics,
wherein the performance metrics summarize throughput and other measured characteristics of a received signal and
the behavior metrics capture transmitter settings that the DUT and the Wi-Fi test devices each choose; and
storing the time series summary stream as the radiated test proceeds; and
post-processing the stored time series summary stream to generate reports, to replay visualizations or to apply pass/fail processing.

21. A device including hardware coupled to the computer readable medium of claim 20.

* * * * *